(12) United States Patent
Richter et al.

(10) Patent No.: US 11,276,507 B2
(45) Date of Patent: Mar. 15, 2022

(54) RADIONUCLIDE GENERATION SYSTEM

(71) Applicant: Framatome GmbH, Erlangen (DE)

(72) Inventors: Thomas Fabian Richter, Marloffstein (DE); Lothar Wistuba, Herzogenaurach (DE); Leila Jaafar, Erlangen (DE); Oliver Arndt, Taunusstein (DE); Uwe Stoll, Heroldsbach (DE)

(73) Assignee: FRAMATOME GMBH, Erlangen (DE)

( * ) Notice: Subject to any disclaimer, the term of this patent is extended or adjusted under 35 U.S.C. 154(b) by 509 days.

(21) Appl. No.: 15/549,215

(22) PCT Filed: Feb. 9, 2015

(86) PCT No.: PCT/EP2015/052646
§ 371 (c)(1),
(2) Date: Aug. 7, 2017

(87) PCT Pub. No.: WO2016/128022
PCT Pub. Date: Aug. 18, 2016

(65) Prior Publication Data
US 2018/0025802 A1    Jan. 25, 2018

(51) Int. Cl.
*G21G 1/02* (2006.01)
*G21C 23/00* (2006.01)
*G21C 17/06* (2006.01)

(52) U.S. Cl.
CPC ............... *G21G 1/02* (2013.01); *G21C 23/00* (2013.01); *G21C 17/066* (2013.01)

(58) Field of Classification Search
CPC .......... G21G 1/001; G21G 1/002; G21G 1/06; G21C 23/00; G21C 19/20
See application file for complete search history.

(56) References Cited

U.S. PATENT DOCUMENTS 3,766,005 A * 10/1973 Erkens ................... G21C 17/10
376/245
4,986,954 A * 1/1991 Feurgard .............. G21C 17/108
376/254
(Continued)

FOREIGN PATENT DOCUMENTS

CN    102893339 A    1/2013
CN    103069500 A    4/2013
(Continued)

OTHER PUBLICATIONS

Taiwanese Official Letter and Search Report dated Sep. 7, 2017 in connection with the Taiwanese counterpart application No. 105104097.
(Continued)

*Primary Examiner* — Lily C Garner
(74) *Attorney, Agent, or Firm* — Dilworth IP, LLC

(57) ABSTRACT

A radionuclide generation system including a tube system configured to permit insertion and removal of irradiation targets into an instrumentation finger of a nuclear reactor, and an irradiation target drive system configured to insert the irradiation targets into the instrumentation finger and to remove the irradiation targets from the instrumentation finger. The radionuclide generation system further includes an instrumentation and control unit which is linked to an online core monitoring system and being configured to calculate optimal irradiation locations for the irradiation targets based on the actual state of the reactor as provided by the online core monitoring system.

16 Claims, 4 Drawing Sheets

(56) References Cited

U.S. PATENT DOCUMENTS

| | | | | |
|---|---|---|---|---|
| 5,120,494 | A * | 6/1992 | Nazareno | F04D 7/08 376/282 |
| 6,229,318 | B1 * | 5/2001 | Suda | G01N 27/121 324/694 |
| 6,264,537 | B1 * | 7/2001 | Penza | B23D 79/023 451/51 |
| 8,542,789 | B2 * | 9/2013 | Russell, II | G21G 1/00 376/189 |
| 8,842,798 | B2 | 9/2014 | Russell et al. | |
| 9,330,798 | B2 * | 5/2016 | Dayal | G21G 1/02 |
| 9,773,577 | B2 * | 9/2017 | Rickard | G21G 1/02 |
| 10,424,417 | B2 * | 9/2019 | Schuster | G21G 1/02 |
| 10,559,391 | B2 * | 2/2020 | Richter | G21C 23/00 |
| 10,734,127 | B2 * | 8/2020 | Richter | G21G 1/0005 |
| 10,854,347 | B2 * | 12/2020 | Richter | G21G 1/02 |
| 2011/0268238 | A1 * | 11/2011 | Lee | G21C 17/10 376/249 |
| 2013/0142298 | A1 * | 6/2013 | Nakanosono | G21C 17/108 376/259 |
| 2013/0170927 | A1 * | 7/2013 | Dayal | G21C 23/00 414/222.01 |
| 2013/0177126 | A1 | 7/2013 | Runkle et al. | |
| 2013/0223578 | A1 * | 8/2013 | Russell, II | G21G 1/02 376/171 |
| 2013/0276892 | A1 * | 10/2013 | Kamp | F16K 31/122 137/1 |
| 2013/0315361 | A1 * | 11/2013 | Berger | G21C 19/32 376/202 |
| 2018/0025802 | A1 * | 1/2018 | Richter | G21C 23/00 376/202 |
| 2018/0308600 | A1 * | 10/2018 | Torgue | C22C 11/00 |

FOREIGN PATENT DOCUMENTS

| | | | |
|---|---|---|---|
| CN | 1030335309 A | 4/2013 | |
| EP | 2093773 A2 | 8/2009 | |
| EP | 2453443 A1 * | 5/2012 | G21C 17/066 |
| ES | 2336188 A1 * | 4/2010 | |
| RU | 2373590 C2 | 11/2009 | |
| TW | 201312593 A | 3/2013 | |

OTHER PUBLICATIONS

International Search Report dated Oct. 22, 2015 in PCT International Application No. PCT/EP2015/052646.

Haebler, D. V., Aeroball System for PWR's, International Atomic Energy Agency Panel on Instrumentation for Nuclear Power Plant Control, Vienna, Austria, Nov. 1969, pp. 1-6.

* cited by examiner

○ Subsystem 1
○ Subsystem 2
● Subsystem 3
◉ Subsystem 4
● 6n-ß detectors
△ shaft
⊗ MAS positions

RADIONUCLIDE GENERATION SYSTEM

FIELD OF THE INVENTION

The invention relates to a radionuclide generation system.

BACKGROUND

Radionuclides are used in various fields of technology and science, as well as for medical purposes. Usually, radionuclides are produced in research reactors or cyclotrons. However, since the number of facilities for commercial production of radionuclides is limited already and expected to decrease, it is desired to provide alternative production sites.

The neutron flux density in the core of a commercial nuclear reactor is measured, inter alia, by introducing solid spherical probes, so-called "aeroballs" into instrumentation tubes ("fingers") passing through the reactor core, using pressurized air for driving the aeroballs in a tube system. There are proposals to use such ball measuring systems for the production of radionuclides.

EP 2 093 773 A2 shows a radionuclide generation system in which short-term radioisotopes having medical applications are generated through nuclear fission in a commercial light water nuclear reactor. Existing instrumentation tubes, conventionally used for housing neutron detectors, are used to generate radionuclides during normal operation of the reactor. Spherical irradiation targets are linearly pushed into and removed from the instrumentation tubes. While the axial neutron flux profile of the reactor core is deemed to be known or calculable, optimum position and amount of exposure time of the targets in the reactor core are determined based at least on this parameter. A driving gear system, an actuator or a pneumatic drive can be used for moving and holding the irradiation targets. An automatic flow control system maintains synchronicity between all subsystems of this ball measuring system.

Similar systems are also known from U.S. Pat. No. 8,842,798 B2 and US 2013/0170927 A1, which specifically describes several drive system embodiments (pathways and transport mechanism for the targets), e.g. based on an existing TIP (traversing incore probe) system. A component like a stop valve or a gate valve may be used in connection with dispensing irradiation targets at particular times and in particular fashion. US 2013/0315361 A1 suggests a valve for sealing off a base of an instrumentation tube. Alternate paths are provided to preserve access to existing TIP tube indexers, or to provide alternate routing to desired destinations. In US 2013/0177126 A1 a retention assembly is shown, including a restricting structure like a fork for selective blocking movement of irradiation targets through a pathway and/or into/out from instrumentation tubes.

SUMMARY OF THE INVENTION

It is an object of the invention to improve the production of radionuclides.

The above object is solved by a radionuclide generation system according to claim 1. Advantageous and expedient embodiments of the invention are indicated in the dependent claims which can be combined with each other independently.

The invention provides a radionuclide generation system comprising a tube system configured to permit insertion and removal of irradiation targets into an instrumentation finger of a nuclear reactor, and an irradiation target drive system configured to insert the irradiation targets into the instrumentation finger and to remove the irradiation targets from the instrumentation finger. According to the invention, the radionuclide generation system further comprises an instrumentation and control unit which is linked to an online core monitoring system and being configured to calculate an optimum irradiation time for the irradiation targets based on the actual state of the reactor as provided by the online core monitoring system.

The invention is based on the finding that existing or future nuclear reactors, whose main purpose is/will be the generation of electrical power, can be used for producing radionuclides. In particular, existing or planned ball measuring systems, or other irradiation systems, of such commercial reactors can be modified and/or supplemented to enable an effective and efficient production of radionuclides.

As already mentioned, a ball measuring system is a system for measuring the neutron flux density at different locations in the reactor core. At least some of the instrumentation fingers and connected tubes of such a ball measuring system can be used to guide the aeroballs, which include a suitable parent material, into the reactor core and to lead the aeroballs out of the reactor core after proper irradiation of the parent material. It is especially noteworthy that the irradiation process is optimized by considering the actual state of the reactor, especially the current neutron flux, burn-up, reactor power and/or loading. Thus, an optimum irradiation time and other parameters of the irradiation process can be calculated for optimum results. With regard to the main idea underlying the invention, It is not important whether the actual calculation is performed in the instrumentation and control unit or by the adapted online core monitoring system of the ball measuring system. Accordingly, both alternatives shall be encompassed.

Preferably, the information provided by the online core monitoring system to the instrumentation and control unit includes at least one of the following: neutron flux (from ex- or in-core detectors), activation values from an existing ball measuring system, burn-up, reactor power, loading, rod position(s), flow rate, inlet-temperature, pressure, time synchronization. The more information about the reactor is considered as input data, the more accurate will be the results of the calculation of the optimum irradiation time. The before mentioned parameters may include real-time values and any derivatives, like developments over time.

According to a sophisticated embodiment of the invention, further parameters, in particular preferred irradiation locations of the irradiation targets in the instrumentation finger, are calculated by the instrumentation and control unit from the information provided by the online core monitoring system.

The instrumentation fingers of the radionuclide generation system are surrounded by the primary coolant of the nuclear reactor. In order to become aware of any leakage in the system immediately, the radionuclide generation system further comprises at least one sensor for detecting ingress of primary coolant.

The sensor for detecting ingress of primary coolant is preferably located at the instrumentation finger or at a component of the tube system.

According to a special aspect of the invention, the sensor is a humidity sensor based on a spark plug which is modified for measuring electrical resistance.

According to a preferred embodiment of the invention, the drive system comprises a battery of valves as a pneumatic system for separate control of the transport of the irradiation targets in the tube system. Based on this separation of controls, the regular ball measuring system (for determining the neutron flux in the core) and the radionuclide generation system according to the invention can be driven separately.

According to a preferred embodiment of the invention, the tube system comprises a separation component splitting the tubes at a cable bridge above the reactor pressure vessel head and/or at a connector board of the nuclear reactor.

According to a preferred embodiment of the invention, the drive system comprises a target filling device for inserting the irradiation targets into the instrumentation finger and removing the irradiation targets from the instrumentation finger after irradiation for further transport in the tube system.

In view of a safe and reliable operation of the target filling device, the instrumentation and control unit is configured such that operation of valves of the target filling device is at least partly automated.

According to a preferred embodiment of the invention, the drive system comprises a gate device for discharging the irradiation targets into a collecting container after irradiation.

According to a preferred embodiment of the invention, the drive system comprises sensors for monitoring the presence and runtime of the irradiation targets and/or any indicator balls passing through the tube system, in particular in and out of the instrumentation finger.

Regarding the measuring principle of these sensors, the variation of the magnetic flux as the irradiation targets and/or indicator balls pass by the sensors may be used. In addition, or as an alternative, radiation sensors sensing the radiation of the irradiation targets and/or indicator balls may be employed.

According to a preferred embodiment of the invention, the instrumentation and control unit is linked to at least one fault monitoring system of the nuclear reactor, in particular to a fault monitoring system of a ball measuring system.

According to a preferred embodiment of the invention, an operator station including a process unit for controlling specific operating parameters of the mechanical components of the drive system, in particular of the battery of valves, is provided.

The instrumentation and control unit may be advantageously configured to automatically control the pressure in the tube system, in particular after each infeed of irradiation targets.

According to a preferred embodiment of the invention, the electric power for the components of the radionuclide generation system is managed by a load cabinet of a ball measuring system and/or by a control cabinet.

BRIEF DESCRIPTION OF THE DRAWINGS

Further features and advantages of the invention will become apparent from the following description and from the accompanying drawings to which reference is made. In the drawings.

DETAILED DESCRIPTION OF THE INVENTION

Figure 1:
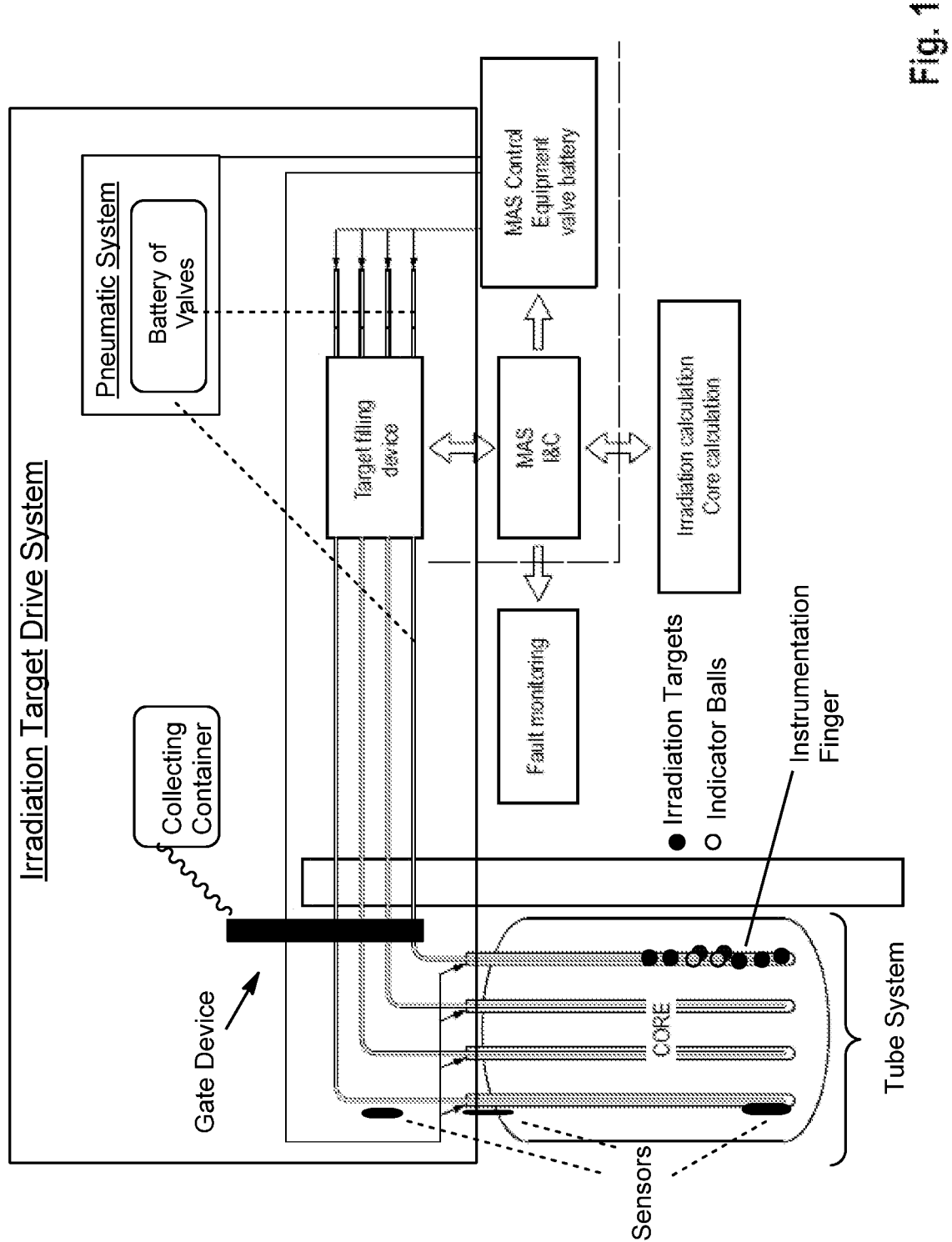
FIG. 1 shows a schematic sketch of a radionuclide generation system (MAS) setup according to the invention including a target filling device, gate device, collecting container, sensors, tube system within a core with irradiation targets and indicator balls positioned in one of the instrumentation fingers, and an alternate pneumatic system, comprising a battery of valves, which may be used for separate control of the transport of the irradiation targets.

FIG. 1 illustrates the basic setup of a radionuclide generation system within a commercial nuclear power plant, in particular a power plant with an EPR™ or Siemens DWR nuclear reactor. The basis of the radionuclide generation system is an existing or otherwise planned ball measuring system, the main purpose of which is to measure the neutron flux density in the core of the nuclear reactor. The ball measuring system includes a drive system configured to insert aeroballs into instrumentation fingers, which extend into the core, and to remove the aeroballs from the instrumentation fingers after irradiation.

The ball measuring system is adapted to also handle special irradiation targets, which are also formed as aeroballs having a diameter of 1.9 mm but include a suitable parent material for generating radionuclides which are to be used for medical and/or other purposes. For easier reference, hereafter the radionuclide generation system based on the existing or planned ball measurement system will be referred to as MAS (Medical Aeroball System).

As shown in FIG. 1 the instrumentation and control (I & C) of the MAS is linked to a target filling device (infeed/outfeed mechanism), a mechanical control equipment including a battery of valves, an adapted online irradiation control system of the ball measuring system, and a fault monitoring system.

Figure 2:
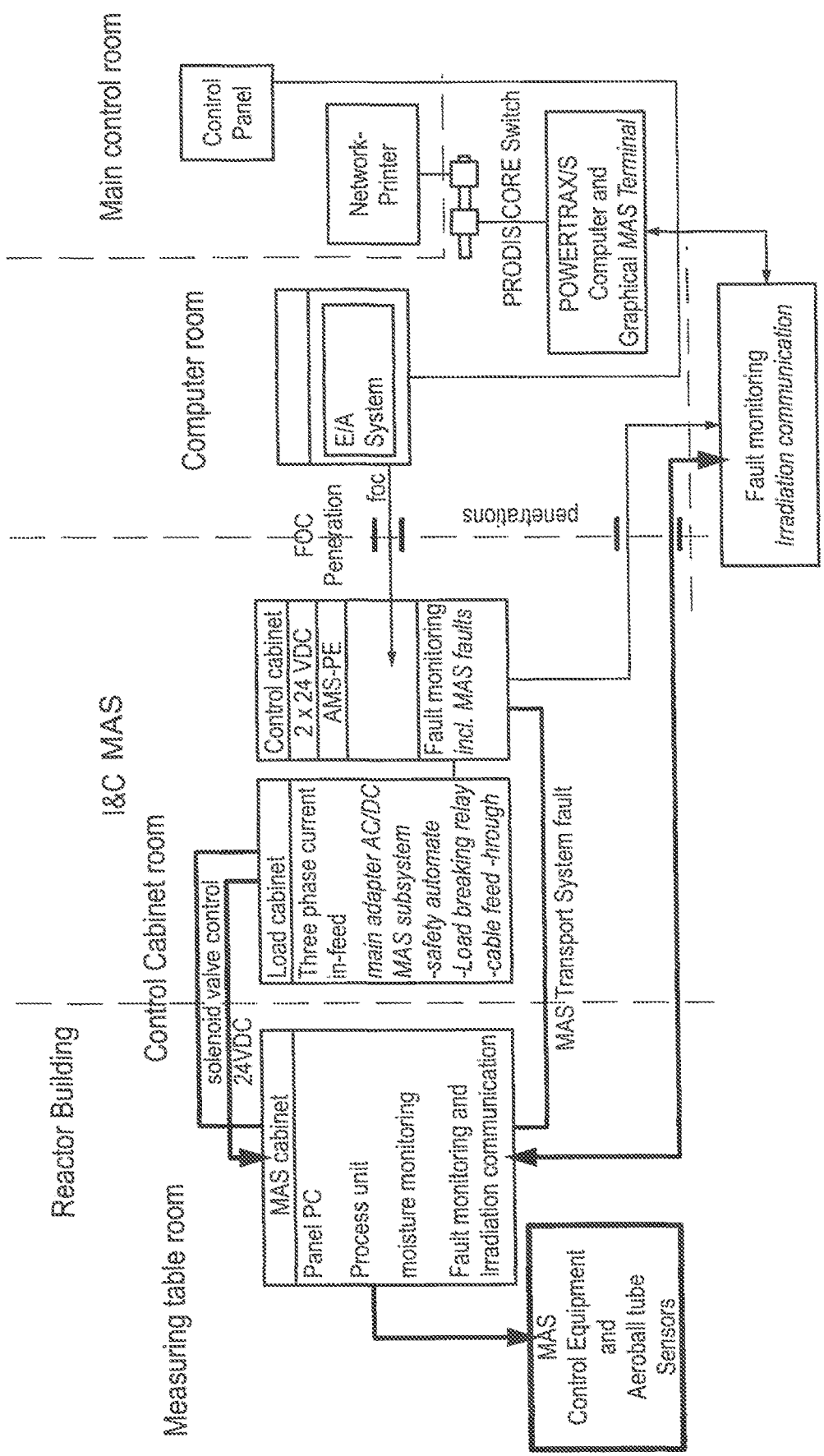
FIG. 2 shows an example of a MAS I & C integration into a ball measuring system.
Figure 3:
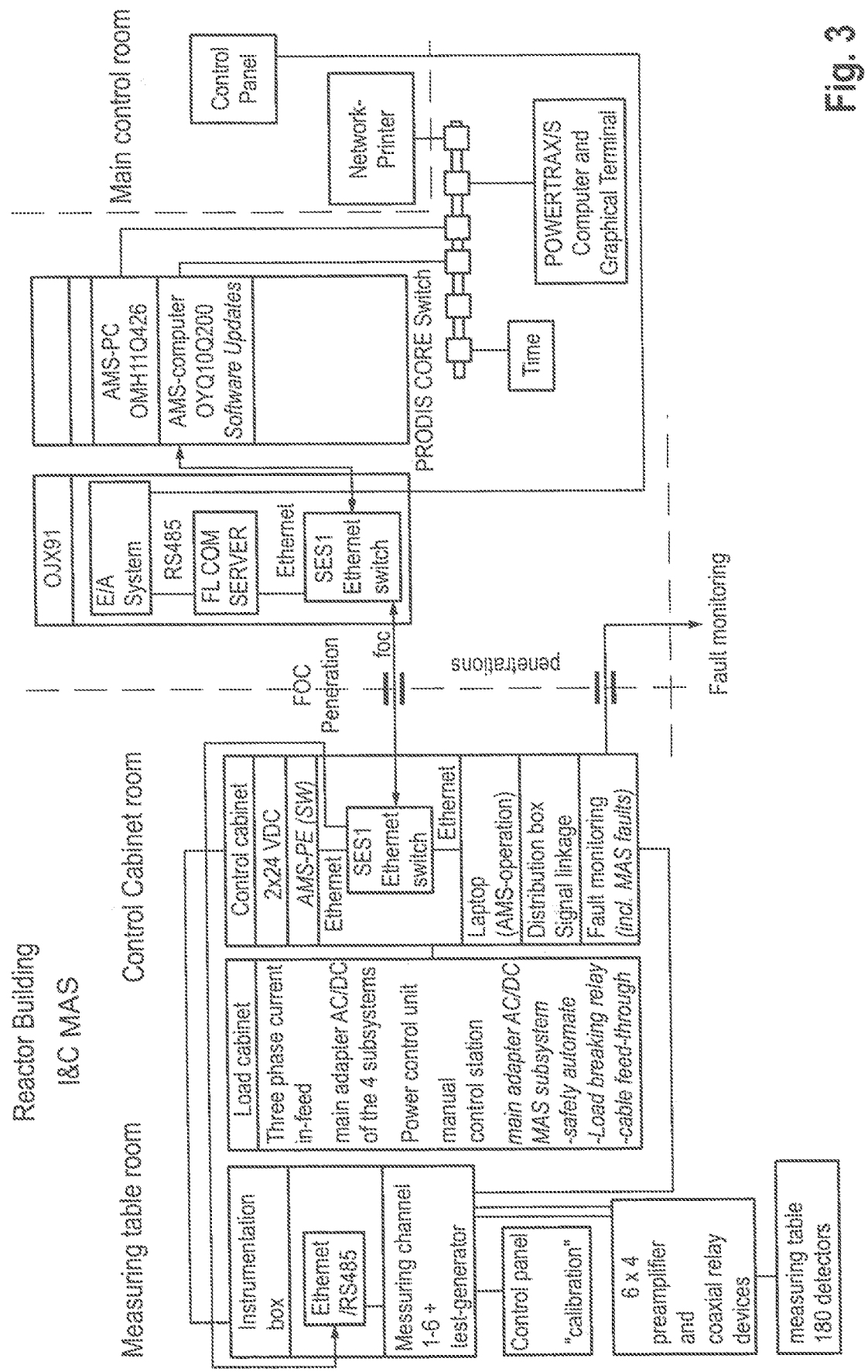
FIG. 3 shows an example of modifications of a MAS I & C in a ball measuring system.

In the following, the major components of the MAS, which are necessary in addition to those of the existing or planned ball measurement system, or which need to be modified, will be described in accordance with FIGS. 2 and 3. The added or modified components are indicated with bold lines and are written in italics in FIGS. 2 and 3.

A battery of valves is used as an additional pneumatic system for separate control of the MAS targets in the tube system. The battery of valves may be implemented as a further subsystem in addition to the valve batteries of the ball measuring system, or a whole new system is installed.

A separation component splits the tubes at the cable bridge above the reactor pressure vessel head, via which the tubes are led out of the reactor well, and/or at the connector board.

A target filling device (infeed/outfeed mechanism) inserts the MAS aeroballs into the instrumentation fingers and removes them from the instrumentation fingers after irradiation for further transport in the tube system.

A gate system including several (electro)-mechanical devices is used to fill the irradiation targets into a tube for transport to the reactor core, and also to discharge the MAS aeroballs into a collecting container after irradiation.

Several humidity sensors are provided to detect any ingress of primary coolant (or any other liquid) into the MAS system. It has to be understood that the instrumentation tubes used for the MAS are in direct contact with the primary cooling water surrounding the core of the nuclear reactor. The humidity sensors may be based on spark plugs which are modified for measuring electrical resistance.

Further sensors are provided for monitoring the presence and runtime of the MAS aeroballs passing through the tubes. These sensors are preferably arranged at the instrumentation tubes penetrating the core. The measuring principle may be based on the detection of a variation of the magnetic flux as the MAS aeroballs (or any indicator balls for measuring transport time and completeness indication) pass by.

Via an interface a MAS I & C control unit is connected with the adapted online core monitoring system software. The control unit is further connected to the mechanical components of the MAS, including the sensors. For an efficient generation of radionuclides optimum irradiation conditions and time for the MAS aeroballs are to be determined. Practically all relevant input data for this calculation are available from the online irradiation control system of the ball measuring system, e. g. the POWERTRAX/S core monitoring software system by Areva. Therefore, the control unit, which is linked to this (adapted) system, can calculate the optimum irradiation time and further parameters, like the amount of MAS aeroballs in an instrumentation finger (defining the actual length of the respective target column and the positions of the individual aeroballs within the target column). Based on the results of these calculations the control unit and/or the operator operate the mechanical MAS components accordingly. The control unit is also connected to an updated fault monitoring system of the ball measuring system for reporting any errors in the MAS.

The online calculation of the optimum irradiation time and other parameters is not simply based on the assumption of an estimated constant neutron flux, but rather takes the actual state of the reactor into account, especially at least one of the following parameters: neutron flux, activation values from an existing ball measuring system, burn-up, reactor power, loading, rod position(s), flow rate, inlet-temperature, pressure, time synchronization. Not only the real-time values of these parameters, but also their development over time may be considered.

Figure 4:
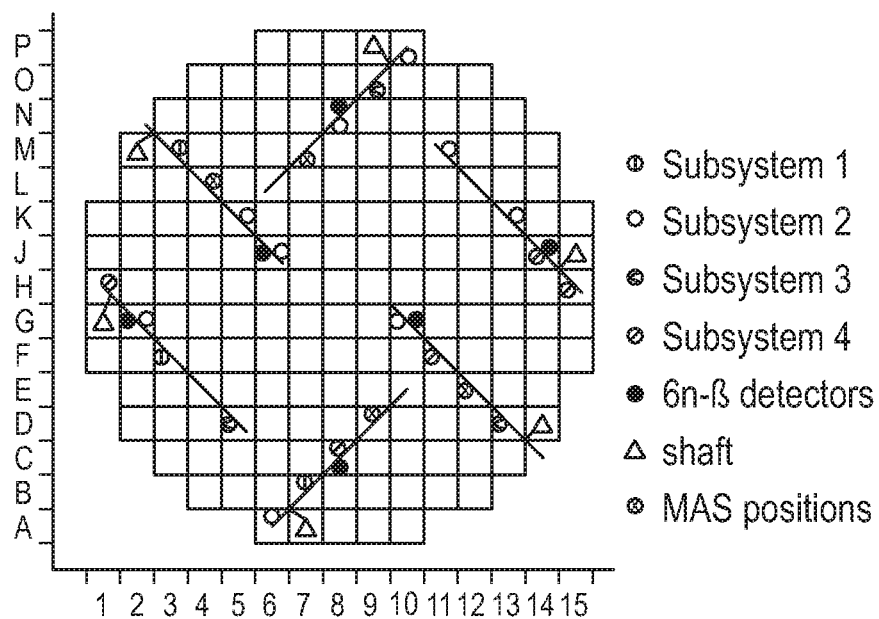
FIG. 4 shows a schematic diagram providing information on the amount of instrumentation fingers, their equipment with ball measuring detectors and their distribution within the core of the nuclear reactor.

FIG. 4 schematically depicts a diagram providing information on the amount of instrumentation fingers, their equipment of ball measuring detectors and their distribution within the core of the nuclear reactor. According to the example shown in FIG. 4, four ball measuring positions are taken from the ball measuring system for use in the MAS.

Figure 5:
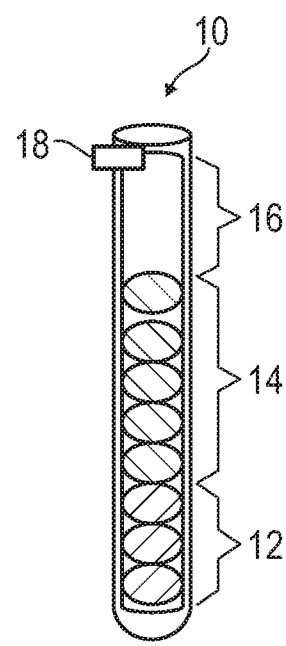
FIG. 5 shows an instrumentation finger filled partly with MAS aeroballs and partly with indicator balls.

FIG. 5 shows a simplified illustration of an instrumentation finger 10 which is used for the MAS. With the aid of the online core monitoring system it is possible to determine areas 12 of the instrumentation finger in which the neutron flux is too low for producing radionuclides, and areas 14 where the neutron flux is above the required irradiation target demand and thus suitable for producing the desired radionuclides. An upper area 16 of the instrumentation finger 10 may be empty. Having the indicator balls below the targets in the instrumentation finger the sensors monitors that all balls have left the finger during blow out process, if the indicator balls pass the sensor FIG. 5 also symbolically shows a humidity sensor 18 that could theoretically be arranged at the instrumentation finger 10. However, the humidity sensors are usually arranged at components of the tube system outside the reactor pressure vessel.

Manual operation of the MAS is performed at an operator station via a process unit. The process unit is installed at a separate control cabinet in a control cabinet room (cf. FIGS. 2 and 3). The process unit is equipped with a display and allows, inter alia, the controlling of specific parameters of the MAS battery of valves.

At the operator station the state of the MAS irradiation targets during irradiation and the remaining irradiation time can be monitored. When the calculated irradiation time of a set of targets in an instrumentation finger is exceeded, a message prompts the operator to start the outfeed process with respect to this instrumentation finger. The operation of the various valves of the infeed/outfeed mechanism is partly automated so that repeating actions are performed more safely and more reliably.

After each infeed with new irradiation targets the pressure in the tube system is checked and regulated in a fully automated manner. The control unit also collects further digital signals representative of certain system conditions. Especially, the signals of the humidity sensors allow a leakage monitoring, i. e. to detect whether any primary coolant has entered the tube system of the MAS.

The electric power for the MAS components, including the battery of valves and the process unit of the MAS cabinet, is realized via the load cabinet of the ball measuring system. To this end, a further power inverter with appropriate fuses is installed in the load cabinet. It is also possible to use an additional 24 volt supply incorporated in the control cabinet room.

The MAS can also be installed in a nuclear power plant without a ball measuring system. The ball measuring system as described above is only the basis that makes an installation of the desired radionuclide generation system easier as no tubes, fingers etc. need to be installed only for the MAS. A possible reactors for such an application could be a CANDU (CANada Deuterium Uranium) reactor.

The invention claimed is:

1. A radionuclide generation system, the system comprising:
    a tube system configured to permit insertion and removal of irradiation targets into an instrumentation finger of a nuclear reactor,
    an irradiation target drive system configured to insert the irradiation targets into the instrumentation finger and to remove the irradiation targets from the instrumentation finger, and
    an instrumentation and control unit,
        the instrumentation and control unit being linked to an online core monitoring system including software executing on a computer, the instrumentation and control unit being configured to calculate from information provided by the online core monitoring system, optimal irradiation locations of the irradiation targets in the instrumentation finger based on an actual state of the reactor,
    wherein the information provided by the online core monitoring system to the instrumentation and control unit includes real-time data indicative of the actual state of the reactor,
    wherein the tube system is further configured to permit insertion and removal of indicator balls into the instrumentation finger, wherein the drive system comprises sensors for monitoring presence and runtime of the irradiation targets and the indicator balls passing through the tube system, and
    wherein the sensors measure radiation, variation of magnetic flux, or both the radiation and the variation of magnetic flux from the irradiation targets and the indicator balls as the irradiation targets and the indicator balls pass by the sensors.

2. The radionuclide generation system according to claim 1, wherein optimal irradiation times for the irradiation targets are based on the actual state of the reactor as provided by the online core monitoring system and are calculated by the instrumentation and control unit from the information provided by the online core monitoring system.

3. A radionuclide generation system, the system comprising:
a tube system configured to permit insertion and removal of irradiation targets into an instrumentation finger of a nuclear reactor;
an irradiation target drive system configured to insert the irradiation targets into the instrumentation finger and to remove the irradiation targets from the instrumentation finger;
an instrumentation and control unit,
the instrumentation and control unit being linked to an online core monitoring system including software executing on a computer, the instrumentation and control unit being configured to calculate from information provided by the online core monitoring system, optimal irradiation locations of the irradiation targets in the instrumentation finger based on an actual state of the reactor according to real-time data indicative of the actual state of the reactor included in the information; and
at least one sensor for detecting ingress of primary coolant,
wherein the tube system is further configured to permit insertion and removal of indicator balls into the instrumentation finger, wherein the drive system comprises additional sensors measuring radiation, variation of magnetic flux, or both the radiation and the variation of magnetic flux from the indicator balls as the indicator balls pass by the additional sensors.

4. The radionuclide generation system according to claim 3, wherein the at least one sensor is located at the instrument finger of the tube system.

5. The radionuclide generation system according to claim 3, wherein the at least one sensor is a humidity sensor.

6. A radionuclide generation system, the system comprising:
a tube system configured to permit insertion and removal of irradiation targets into an instrumentation finger of a nuclear reactor,
an irradiation target drive system configured to insert the irradiation targets into the instrumentation finger and to remove the irradiation targets from the instrumentation finger, and
an instrumentation and control unit,
the instrumentation and control unit being linked to an online core monitoring system including software executing on a computer, and the instrumentation and control unit being configured to calculate from information provided by the online core monitoring system, optimal irradiation locations of the irradiation targets in the instrumentation finger based on an actual state of the reactor,
wherein, for the calculation of the optimal irradiation locations of the irradiation targets in the instrumentation finger, the instrumentation and control unit is configured, based on the information provided by the online core monitoring system including real-time neutron flux data, to locate first areas at a bottom of the instrumentation finger where the neutron flux is too low for producing radionuclides, and configured to locate second areas above the first areas where the neutron flux is suitable for producing the desired radionuclides.

7. The radionuclide generation system according to claim 6, wherein the drive system comprises a battery of valves as a pneumatic system for separate control of a transport of the irradiation targets in the tube system.

8. The radionuclide generation system according to claim 7, wherein the instrumentation and control unit is configured to automatically control pressure in the tube system.

9. The radionuclide generation system according to claim 7, comprising an operator station including a process unit for controlling specific operating parameters of the battery of valves.

10. The radionuclide generation system according to claim 6, wherein the drive system comprises a target filling device for inserting the irradiation targets into the instrumentation finger and removing the irradiation targets from the instrumentation finger after irradiation.

11. The radionuclide generation system according to claim 6, wherein the drive system comprises a gate device for discharging the irradiation targets into a collecting container after irradiation.

12. The radionuclide generation system according to claim 6, wherein the tube system is further configured to permit insertion and removal of indicator balls into the instrumentation finger, wherein the drive system comprises sensors for monitoring presence and runtime of the irradiation targets and the indicator balls passing through the tube system.

13. The radionuclide generation system according to claim 12, wherein the sensors measure radiation, variation of magnetic flux, or both the radiation and the variation of magnetic flux from the irradiation targets and the indicator balls as the irradiation targets and the indicator balls pass by the sensors.

14. The radionuclide generation system according to claim 6, wherein the instrumentation and control unit is linked to at least one fault monitoring system of the nuclear reactor.

15. The radionuclide generation system according to claim 14, wherein the at least one fault monitoring system is linked to a fault monitoring system of a ball measuring system.

16. The radionuclide generation system according to claim 6, wherein, for the calculation of the optimal irradiation locations of the irradiation targets in the instrumentation finger, the instrument finger is filled partly with the irradiation targets and partly with indicator balls, wherein the system further comprises sensors measuring radiation, variation of magnetic flux, or both the radiation and the variation of magnetic flux from the indicator balls as the indicator balls pass by the sensors.

* * * * *